United States Patent [19]

Thibault et al.

[11] 4,411,354
[45] Oct. 25, 1983

[54] TRANSPORT INSTALLATION FOR MANUFACTURED PRODUCTS, PARTICULARLY ELEMENTS OF AUTOMOBILE BODIES

[75] Inventors: Bernard Thibault, Boulogne Billancourt; André Le Goff, Neauphle-le-Chateau, both of France

[73] Assignee: Regie Nationale des Usines Renault, Boulogne-Billancourt, France

[21] Appl. No.: 207,473

[22] Filed: Nov. 17, 1980

[30] Foreign Application Priority Data

Dec. 6, 1979 [FR]  France ............................ 79 29990
Nov. 3, 1980 [FR]  France ............................ 80 23450

[51] Int. Cl.³ .............................................. B65G 37/00
[52] U.S. Cl. ........................................................ 198/472
[58] Field of Search .................. 198/472, 580, 447; 29/33 P, 563

[56] References Cited

U.S. PATENT DOCUMENTS

| | | | |
|---|---|---|---|
| 2,028,008 | 1/1936 | Peyinghaus | 29/33 P |
| 2,120,966 | 6/1938 | Clark | 198/472 |
| 2,798,267 | 7/1957 | Anderson | 29/33 P |
| 2,861,672 | 11/1958 | Buhrer | 198/472 |
| 4,035,904 | 7/1977 | Ishizaka et al. | 198/472 |
| 4,267,918 | 5/1981 | Steinbrecher | 198/472 |

FOREIGN PATENT DOCUMENTS 566008 11/1932  Fed. Rep. of Germany .
2258244 8/1975  France .
771790 6/1955  United Kingdom .

*Primary Examiner*—Joseph E. Valenza
*Attorney, Agent, or Firm*—Oblon, Fisher, Spivak, McClelland & Maier

[57] ABSTRACT

The invention relates to a transport installation for manufactured products. In this invention the return line consists of two parallel tracks separated by a median line of central supports supporting the upper advance line and each defined on the outside by a lateral structure forming struts for said upper advance line. This provides a wide foundation and strength for the assembly compatible with a robot assembly and the clearance necessary for the movements of the work arms of the latter. Application is to the transportation of automobile body elements.

5 Claims, 5 Drawing Figures

4,411,354

TRANSPORT INSTALLATION FOR MANUFACTURED PRODUCTS, PARTICULARLY ELEMENTS OF AUTOMOBILE BODIES

BACKGROUND OF THE INVENTION

1. Field of the Invention

The present invention relates to a transport installation for manufactured products, particularly elements of automobile bodies, and particularly for assembly lines automated with robots.

2. Description of the Prior Art

Making general use of robots or programmable machines to automate an automobile manufacturing transport chain requires a structure below the chain which, while being extremely rigid, provides a nearly optimal clearance allowing maximum work arm range for the robot.

In addition, use of programmable machines make it possible, thanks to multi-programming, for the machine to carry out successively, at will and without interruption, the same assembly operation in the assembly or subassembly of different types of bodies by a simple selection of the program controlling the movements of the machine's working arm. Thus, it is desirable to allow selective introduction into the transport chain of at least two distinct types of mounting supports, each adapted to receive elements of different body types.

It is known to use body element transport installations or chains in automobile assembly lines comprising an upper line, which advances the mounting supports for said body elements, and a lower line, which returns the mounting supports when empty, thereby forming a storage line accumulating said mounting supports and extending below the upper line. Until now these installations have not permitted free selection at will of the mounting supports on the lower return line and accumulation storage, as a function of the immediate need or wish to assemble successively different body types.

It is also very advantageous to be able to selectively secure at least three variants or distinct body element types to the same transport chain. Preferably, these would be bodies intended respectively for a part of a vehicle being produced at a constant rate, a vehicle being produced at a decreasing rate and a vehicle being produced at an increasing rate. This would provide for optimum flexibility during transition periods when production of an outgoing model is being reduced and a new model is being simultaneously phased in.

SUMMARY OF THE INVENTION

The object of the present invention is specifically to adapt this type of transport system with a view toward responding to the needs cited above.

To that end the transport system for manufactured products, particularly automobile body elements, which forms the object of the present invention, is characterized by a return line comprising at least two parallel tracks separated by a median line of central supports which support the upper advance line. The two parallel tracks are each exteriorly defined by a lateral structure forming struts for the upper advance line, thus assuring a wide foundation and giving the assembly strength compatible with installations using robots. The clearance range needed for the working arm of the robots is also provided for.

According to a preferred embodiment, the median line of central supports is divided into two parallel lines, simultaneously supporting the upper advance line and defining a third central return track of empty assembly supports located below the upper advance line.

According to the other advantageous characteristics of the invention, each of the parallel return tracks is supplied with mounting supports specifically designed to receive the elements of different body types. Preferably, in the variant with three parallel return tracks, one is for mounting supports specified for a constant vehicle production rate, the second for a decreasing vehicle production rate, and the third for a vehicle production rate which is increasing to compensate for the second.

Finally, the selectively supplying each of the parallel return tracks and the upper advance line with specific mounting supports is assured by the use of lateral translators of a known type guided by selective associated reference marks for different body element types entering and leaving the installation.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
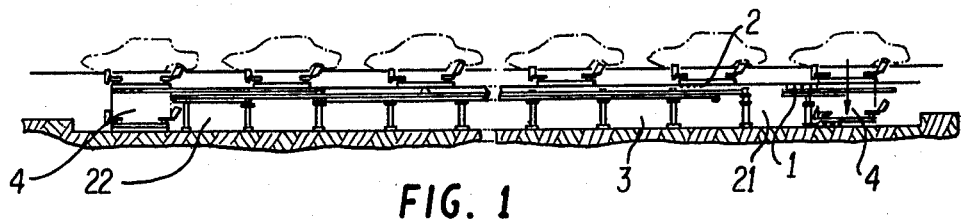
FIG. 1 is a schematic view in elevation of the transport installation according to the invention.
Figure 2:
FIG. 2 shows a schematic plan of the installation in FIG. 1.

The drawings show, particularly in FIGS. 1 and 2, that the installation is formed essentially of an upper advance line 1, which moves step-by-step. The line 1 holds the mounting supports 2, which are preferably carriages. There is also a lower line 3, driven by rollers and controlled by brake motors of a known type. This line 3 returns the empty mounting supports 2, thus forming an accumulation storage line. Supplying the mounting supports 2 for each line when transferring from one to another is done at the entrance and exit ends of the chains formed by the mounting supports by an elevator table 4 in a classic manner.

Figure 3:
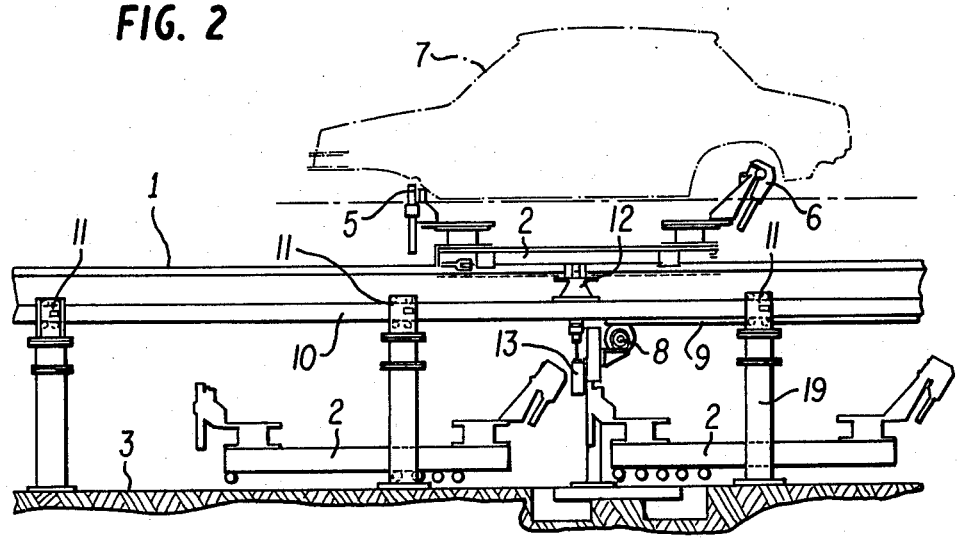
FIG. 3 is a partial enlarged view of the installation in FIG. 1.
Figure 4:
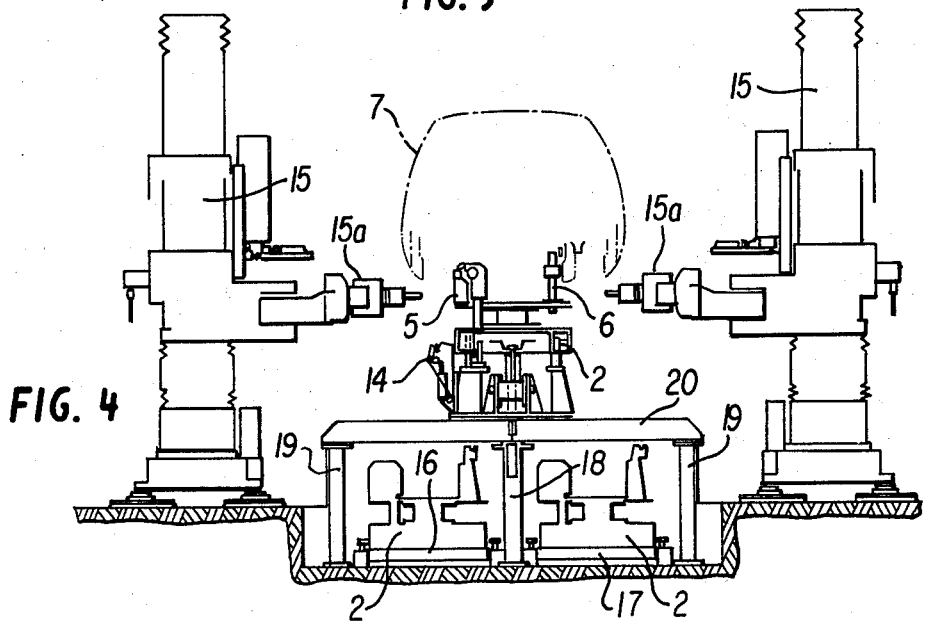
FIG. 4 is a transverse section of FIG. 3.
Figure 5:
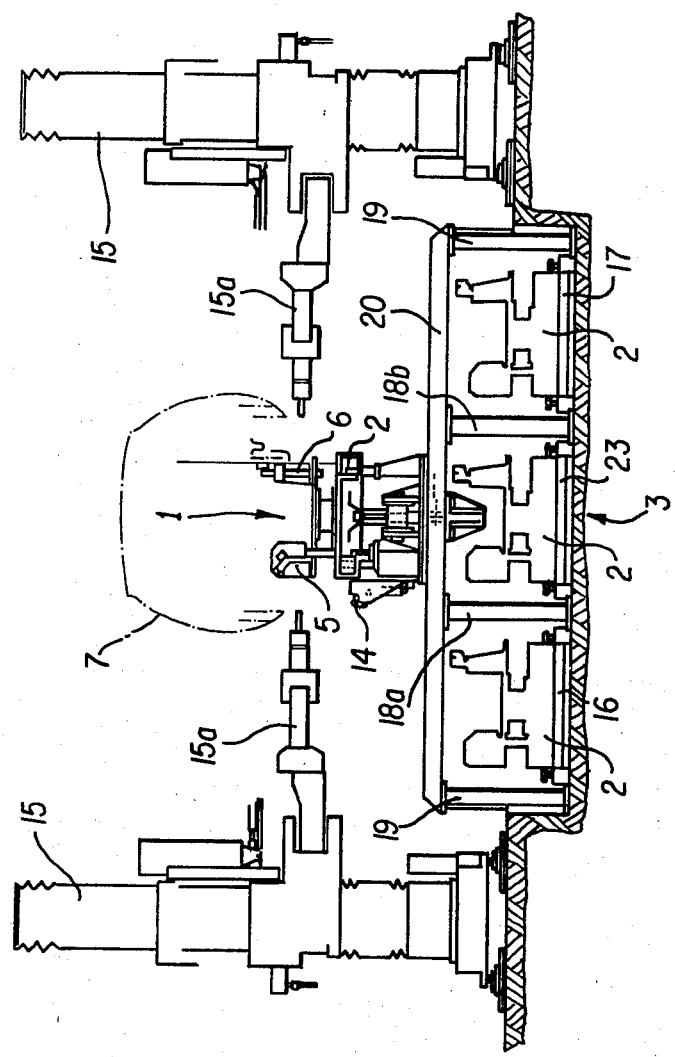
FIG. 5 is a variant of the embodiment shown in FIG. 4.

As is shown particularly in FIGS. 3, 4 and 5, the mounting supports 2 are provided with appropriate fluid motor means 5, 6 for centering and locking on of the body elements 7. The body elements are carried along in step-by-step translation on the upper advance line 1 by a driven (pinion) gear system 8, and a rack 9 which has an alternating back-and-forth horizontal movement. The rack is connected to the body elements by means of a transport bar 10, sliding in the guide case 11 on rollers, and provided with jaws 12 which move step-by-step with the mounting supports 2. Said jaws 12 are vertically retractable by hydraulic jacks 13 which allow the return movement of the transport bar 10.

The upper advance line 1 is also made up of lateral locking means 14, also hydraulically controlled, for indexing and locking the mounting supports 2 at the different assembly points and robot 15 work stations.

In conformity to the object of the invention, and as shown in detail in FIG. 4, the return line 3 for the empty mounting supports 2 consists of two parallel tracks 16, 17, separated by the median line of central supports 18, made up of columns lined up along the longitudinal axis of the upper advance line 1 and supporting said upper advance line 1. The two parallel tracks 16, 17 are each defined on the outeside by a lateral structure made up of external rows of parallel columns 19 aligned with the central supports 18 and of horizontal transverse beams 20 having their extremities on the external columns 19. Said lateral structure forms struts for the upper advance line 1, provides for a broad foundation and gives the transport assembly strength compatible with the use of robots 15 and the clearance needed for optimal reach of the work arm 15a of the latter.

In the preferred embodiment shown in FIG. 5 the median line of central supports is divided into the parallel lines 18a, 18b of columns aligned below the lateral limits of the upper advance line 1 for the purpose of supporting the latter and defining a third central return track 23 of empty mounting supports 2, located below said upper advance line 1.

Each of the parallel return tracks 16, 17 and 23 is separately supplied with mounting supports 2, fed by centering and locking elements 5, 6, specifically designed to receive different types of body elements.

The lower return line 3 of empty mounting supports 2 has at each of its extremities a lateral translator of a known type, not shown in the drawing, and incorporated in the immediate proximity of the elevator tables 4 at places designated by 21, 22 in FIGS. 1 and 2. The lateral translator, situated at the entrance 21 to the lower return line 3, serves to distribute the mounting support 2 types on one or the other of tracks 16, 17 and 23 for return storage by accumulation, according to the elements of the body types 7 which they are intended to receive. The lateral translator situated at the exit 22 allows selection according to the model needs of the mounting supports 2 supplying the upper advance line 1. The lateral displacement of the translators may be guided by means of selective optical or mechanical reference marks, not shown in the drawing, associated with different body element types arriving at the entrance and exit of the installation, and equally taking part in the selection of the movement program of the work arm 15a of robot 15. Therefore it is easy to selectively introduce on the transport chain at least two distinct models of mounting supports 2, each adapted to receive different body element types.

In the embodiment shown in FIG. 5 the three parallel return tracks 16, 17 and 23 form accumulation storage lines. Any one can then be advantageously used for mounting supports used with bodies produced at a constant rate. A second is for a vehicle being produced at a decreasing rate, and the third is for a vehicle being produced at an increasing rate to compensate for the second. This would permit optimum absorption flexibility during transition periods when production of an out-going model is being reduced and a new model is being simultaneously phased in.

The scope of the present transport installation for manufactured products, specifically for body elements, is in no way limited by the embodiment forms described above, but may include all variant executions based on the same principle. For example, lower return line 3 for empty mounting supports 2 may, in certain cases, have more than three parallel return tracks without exceeding the limits of the invention.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A robot automated assembly line for automobile body elements, comprising:
    at least two types of mounting supports for said body elements;
    an upper advance line holding a plurality of said mounting supports, wherein said body elements are acted upon by robots;
    means for advancing said mounting supports along said upper advance line; and
    a lower return line extending beneath said upper advance line for accumulating and storing said mounting supports, said return line including at least two parallel side-by-side tracks, each of said tracks being separated by a longitudinal series of central supports, said return line being laterally defined by a longitudinal series of columns, said columns defining supports for the upper advance line, said columns providing a wide foundation for supporting said upper advance line and providing said upper advance line with clearance for the arms of said robots;
    wherein said each said return tracks being adapted for returning a selected type of said mounting supports.

2. The assembly line of claim 1 wherein said return line comprises three parallel tracks separated by two series of central supports.

3. The assembly line of claims 1 or 2 including means for supplying a different type of mounting support to and from each of said tracks of said return line.

4. The assembly line of claim 2 including means for respectively supplying to and from the first, second and third of said three tracks, mounting supports adapted for a vehicle being produced at a constant rate, mounting supports adapted for a vehicle produced at a decreasing rate and mounting supports adapted for a vehicle produced at an increasing rate.

5. The assembly line of claim 3 wherein said means for supplying comprise lateral translators and associated body element type reference means located at the ends of said assembly line.

* * * * *